US007427025B2

(12) United States Patent
Poulin et al.

(10) Patent No.: US 7,427,025 B2
(45) Date of Patent: Sep. 23, 2008

(54) AUTOMATED POSTAL VOTING SYSTEM AND METHOD

(75) Inventors: Jeffrey S. Poulin, Endicott, NY (US); Graeme S. Urquhart, Havant (GB)

(73) Assignee: Lockheed Marlin Corp., Bethesda, MD (US)

( * ) Notice: Subject to any disclaimer, the term of this patent is extended or adjusted under 35 U.S.C. 154(b) by 416 days.

(21) Appl. No.: 11/176,256

(22) Filed: Jul. 8, 2005

(65) Prior Publication Data

US 2007/0007341 A1 Jan. 11, 2007

(51) Int. Cl.
*G06K 17/00* (2006.01)
*G07C 13/00* (2006.01)

(52) U.S. Cl. ........................................ 235/386; 705/12

(58) Field of Classification Search ................. 235/386, 235/380, 375, 51; 705/12
See application file for complete search history.

(56) References Cited

U.S. PATENT DOCUMENTS

| | | | |
|---|---|---|---|
| 3,701,165 | A | 10/1972 | Huddleston |
| 3,839,637 | A | 10/1974 | Willis |
| 3,942,154 | A | 3/1976 | Akami et al. |
| 3,991,706 | A | 11/1976 | Pearl |
| 4,150,781 | A | 4/1979 | Silverman et al. |
| 4,397,142 | A | 8/1983 | Bingham |
| 4,527,383 | A | 7/1985 | Bingham |
| 4,623,579 | A | 11/1986 | Quon |
| 4,637,051 | A | 1/1987 | Clark |
| 4,660,221 | A | 4/1987 | Dlugos |
| 4,743,747 | A | 5/1988 | Fougere et al. |
| 4,767,205 | A | 8/1988 | Schwartz et al. |
| 4,775,246 | A | 10/1988 | Edelmann et al. |
| 4,864,618 | A | 9/1989 | Wright et al. |
| 4,934,846 | A | 6/1990 | Gilham |
| 4,972,475 | A | 11/1990 | Sant'Anselmo |
| 4,982,437 | A | 1/1991 | Loriot |
| 5,036,610 | A | 8/1991 | Fehr |
| 5,075,862 | A | 12/1991 | Doeberl et al. |
| 5,142,482 | A | 8/1992 | Sansome |
| 5,142,577 | A | 8/1992 | Pastor |
| 5,227,617 | A | 7/1993 | Christopher et al. |
| 5,283,422 | A | 2/1994 | Storch et al. |
| 5,285,382 | A | 2/1994 | Muehlberger et al. |

(Continued)

FOREIGN PATENT DOCUMENTS

| | | |
|---|---|---|
| CA | 2152835 | 1/1996 |

(Continued)

OTHER PUBLICATIONS

U.S. Appl. No. 11/006,725, filed Dec. 8, 2004 Poulin.

(Continued)

*Primary Examiner*—Edwyn Labaze
(74) *Attorney, Agent, or Firm*—Miles & Stockbridge PC; James T. Carmichael

(57) ABSTRACT

A voting indicium product including a human-readable portion to represent a unique vote identification element for a specific ballot choice by a specific voter. The voting indicium further including a bar-coded portion to represent the unique vote identification element for the specific ballot choice by the specific voter, the bar-coded portion encoding at least the unique vote identification element.

16 Claims, 9 Drawing Sheets

U.S. PATENT DOCUMENTS

| | | | |
|---|---|---|---|
| 5,289,547 | A | 2/1994 | Ligas et al. |
| 5,319,562 | A | 6/1994 | Whitehouse |
| 5,337,361 | A | 8/1994 | Wang et al. |
| 5,375,172 | A | 12/1994 | Chrosny |
| 5,390,251 | A | 2/1995 | Pastor et al. |
| 5,498,034 | A | 3/1996 | Ford |
| 5,555,497 | A | 9/1996 | Helbling |
| 5,586,036 | A | 12/1996 | Pintsov |
| 5,592,561 | A | 1/1997 | Moore |
| 5,666,421 | A | 9/1997 | Pastor et al. |
| 5,786,219 | A | 7/1998 | Zhang et al. |
| 5,798,834 | A | 8/1998 | Brooker |
| 5,822,739 | A | 10/1998 | Kara |
| 5,895,073 | A | 4/1999 | Moore |
| 5,917,925 | A | 6/1999 | Moore |
| 5,974,147 | A | 10/1999 | Cordery et al. |
| 6,005,945 | A | 12/1999 | Whitehouse |
| 6,039,257 | A | 3/2000 | Berson et al. |
| 6,085,182 | A | 7/2000 | Cordery |
| 6,249,777 | B1 | 6/2001 | Kara et al. |
| 6,381,589 | B1 | 4/2002 | Leon |
| 6,385,504 | B1 | 5/2002 | Pintsov et al. |
| 6,438,530 | B1 | 8/2002 | Heiden et al. |
| 6,505,179 | B1 | 1/2003 | Kara |
| 6,701,304 | B2 | 3/2004 | Leon |
| 6,779,727 | B2 * | 8/2004 | Warther ................. 235/462.01 |
| 6,816,844 | B2 | 11/2004 | Leon |
| 6,889,214 | B1 | 5/2005 | Pagel et al. |
| 7,210,617 | B2 * | 5/2007 | Chaum ........................ 235/51 |
| 2001/0042052 | A1 | 11/2001 | Leon |
| 2002/0026430 | A1 | 2/2002 | Ryan, Jr. |
| 2002/0096560 | A1 | 7/2002 | Page |
| 2002/0120668 | A1 | 8/2002 | Leon |
| 2003/0062411 | A1 * | 4/2003 | Chung et al. .................. 705/12 |
| 2003/0089765 | A1 | 5/2003 | Kovlakas |
| 2003/0101148 | A1 | 5/2003 | Montgomery et al. |
| 2003/0155703 | A1 | 8/2003 | Zimmermann |
| 2003/0182238 | A1 | 9/2003 | Brookner et al. |
| 2003/0219145 | A1 | 11/2003 | Smith |
| 2003/0225711 | A1 | 12/2003 | Paping |
| 2003/0232571 | A1 | 12/2003 | Weinerth |
| 2004/0059680 | A1 | 3/2004 | Lang et al. |
| 2004/0078346 | A1 | 4/2004 | Amonette et al. |
| 2004/0083189 | A1 | 4/2004 | Leon |
| 2004/0093312 | A1 | 5/2004 | Cordery et al. |
| 2004/0122779 | A1 | 6/2004 | Stickler et al. |
| 2004/0128190 | A1 * | 7/2004 | Campo et al. ................. 705/12 |
| 2004/0128254 | A1 | 7/2004 | Oubtsiv |
| 2005/0039092 | A1 * | 2/2005 | Soule et al. ................. 714/724 |
| 2005/0256811 | A1 | 11/2005 | Pagel et al. |

FOREIGN PATENT DOCUMENTS

| | | | |
|---|---|---|---|
| DE | 19812903 | A1 | 3/1998 |
| EP | 0328320 | A1 | 8/1989 |
| EP | 0663652 | A2 | 7/1995 |
| EP | 0710930 | A2 | 5/1996 |
| EP | 0741374 | A2 | 5/1996 |
| EP | 0931297 | | 7/1999 |
| EP | 0952558 | A2 | 10/1999 |
| EP | 1035515 | A2 | 5/2000 |
| EP | 1310917 | A2 | 5/2003 |
| FR | 2708432 | A1 | 2/1995 |
| GB | 2271452 | A | 4/1994 |
| WO | WO 88/01818 | A1 | 3/1988 |
| WO | WO 9721203 | | 6/1997 |
| WO | WO 98/14907 | | 4/1998 |
| WO | WO 9966456 | | 12/1999 |
| WO | WO 0129781 | A1 | 4/2001 |
| WO | WO 01/43053 | A2 | 6/2001 |
| WO | WO 02/069103 | A2 | 9/2002 |
| WO | WO 2004/012053 | A2 | 2/2004 |
| WO | WO 2004/029754 | A2 | 4/2004 |

OTHER PUBLICATIONS

U.S. Appl. No. 11/006,726, filed Dec. 8, 2004 Poulin.
U.S. Appl. No. 11/006,736, filed Dec. 8, 2004 Poulin.
Jimenez, Luis A., "The Mail in 2010", World Mail & Express Conference, London, May 15-17, 2001.
GFT: Indicia Server, API Specification, Revision 1.2, Feb. 12, 2003, 41 pages.
International Preliminary Report on Patentability and Written Opinion dated Jun. 21, 2007.
Office Action dated Mar. 31, 2008 in U.S. Appl. No. 11/006,725.

* cited by examiner

AUTOMATED POSTAL VOTING SYSTEM AND METHOD

BRIEF DESCRIPTION OF THE DRAWINGS

The present invention will be described with reference to the accompanying drawings.

DETAILED DESCRIPTION

Figure 1:
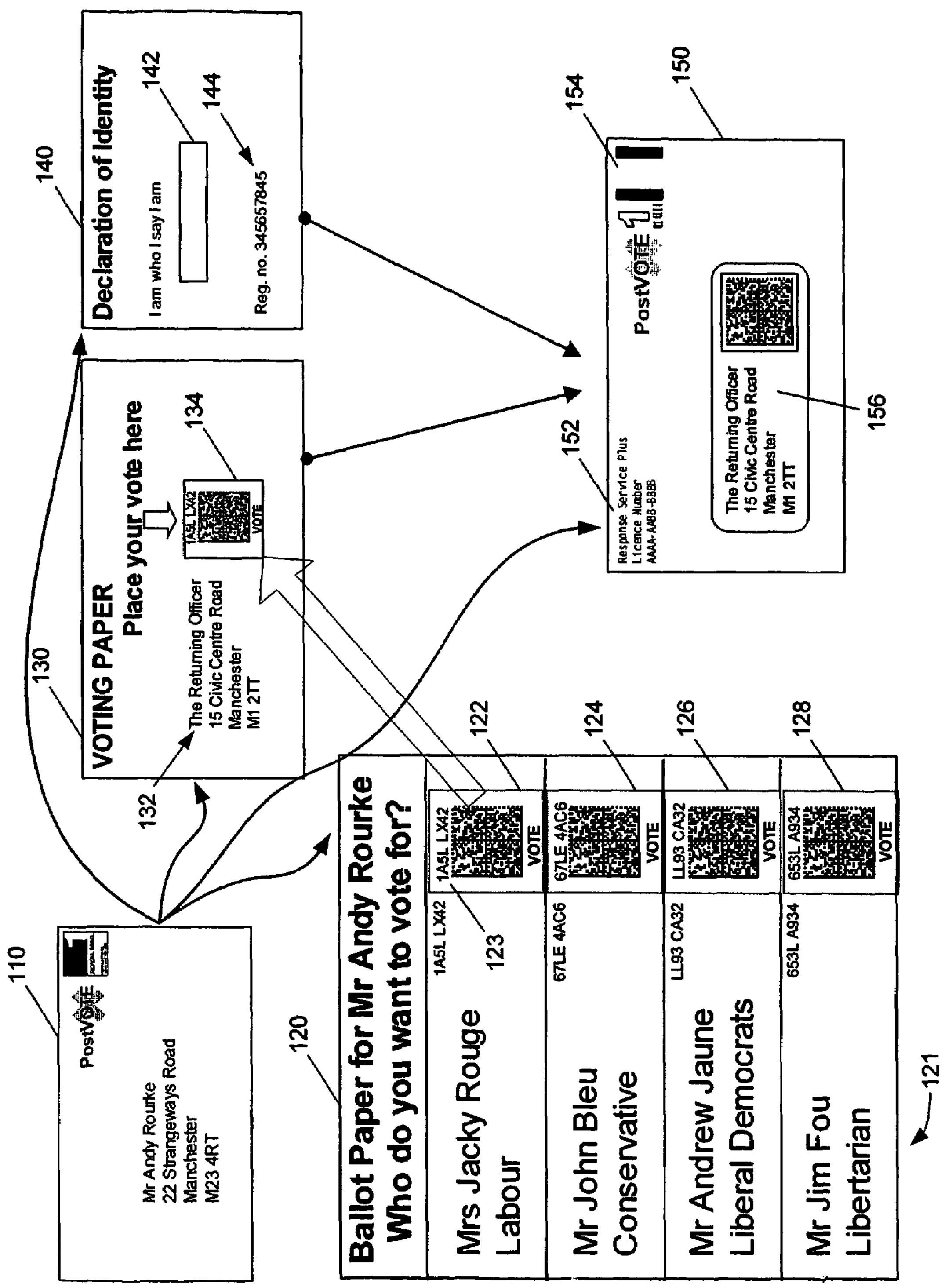
FIG. 1 is an example of a number of postal voting stationery components that may be used in accordance with embodiments of the present invention.

In accordance with an embodiment of the present invention, the use of a postal voting indicium including, for example, a stamp, a sticker, a label, on pre-printed card(s), etc., in an automated postal voting system offers several benefits over traditional postal voting, including, but not limited to, greater security and confidentiality and automated vote counting. Greater security may be achieved by preventing access to at least two independent databases/data sources using, for example, an encryption algorithm and associated key so non unauthorized personnel can't tell who voted, nor for whom. In addition, no personal information may be contained on the voting paper returned; duplication checks may be performed to combat fraud; and support is optionally provided to remove votes related to invalid voter Declarations of Identity. Embodiments of the system may be used in local, state and/or national elections as well as for any number of private groups/organizations voting, for example, elections, proxy votes, etc.

Likewise, vote counting may be accomplished automatically, since the votes may be sorted by mail or other automated processing equipment so as to prevent introducing delays to delivery timescales and without further duplication of work. In addition, automated vote counting may improve count accuracy, since barcode read error rate is proven to be extremely small, as well as being much faster than manual counts. Likewise, automated vote counting may provide improved ballot statistics, for example, data may be made available on when votes are posted, and from where; and improved tracking of postal votes may be realized as they are sent out through the mail, and as they are returned and sorted.

In accordance with embodiments of the present invention, a method, system and product for automated postal voting, which also may be referred to as voting by mail, may include multiple secure data sources, postal voting stationery including at least one postal voting indicium and the use of each thereof. Specifically, the method, system and product may integrate data and the voting stationery necessary to enable voting by mail to include secure data sources (e.g., separate, secure data bases and/or separate, secure tables within a single data base); postal voting stationery components may include a delivery envelope, a ballot paper with the at least one postal voting indicium, a voting card, and a return envelope. In some, although not all, embodiments a voter declaration of identity card also may be part of the postal voting stationery components. "Mail" as used herein may apply to mail items (e.g., letters such as that defined by the return envelope of the postal voting stationery described herein) that are, in general, sent via a public/private postal service. However, the method, system and product also may be used with non-postal delivery service providers, for example, overnight delivery service providers and/or third party/corporate mail processing centers. In addition, in some embodiments, the mail items may be sent as an electronic mail item and returned as a hard copy mail item (e.g., letter) and/or an electronic mail item. "Mail items" may include letters, packages, parcels, boxes, and the like of all shapes and sizes.

In accordance with an embodiment of the present invention, a postal voting indicium may include all information necessary to determine a value, e.g., which ballot option/choice, the postal voting indicium may represent. The postal voting indicium may include a human-readable portion and a machine-readable portion. For example, the human-readable portion, although not required, is useful and may be limited to only a unique vote identification ("ID") number/value, which, generally, is also encoded in the machine-readable portion. However, the human-readable portion also may include a generic message to encourage the recipient to use the provided postal voting stationery to vote. For example, the message may include "VOTE!", "VOTE NOW!", and/or any other marketing-type phrases designed to encourage voter participation. The machine-readable portion may include some or all of, but is not limited to, header information, bar code version to aid in identifying the indicium as a postal voting indicium, a vote identification, a date on which the postal voting indicium was printed, a key identification value, and a security code.

Although, the information in the postal voting indicium may appear in both human-readable and machine-readable formats, e.g., text and barcodes, respectively, reading the information from the postal voting indicium may be accomplished using automated equipment. For example, the barcode may be printed both with and without the human-readable information, and any human-readable information printed with the barcode may also be coded in the barcode. However, some of the information used in embodiments of the present invention, may only be printed in the barcode for security and privacy reasons. Regardless, the entire postal voting indicium may be read (e.g., a bit-mapped image of the human-readable portion may be made and the image may be converted to actual digital character values; and the barcode may be scanned and the pattern converted to represent digital character values of information encoded in the barcode). To convert the bit-mapped image to actual digital character values may require an optical character recognition ("OCR") program be run that may determine the value of each character of the human-readable portion and save it as such. In general, the entire postal voting indicium may be read (e.g., scanned) at a mail processing facility in a single scan of a mail piece on which the postal voting indicium is affixed, scanned, and deciphered and the deciphered postal voting indicium information may be sent to an automated postal voting system to count the vote defined by the postal voting indicium.

In the method, a first data store/data base may be generated of every possible vote, which could be cast by every possible voter. For each of these possible votes (e.g., "Available Votes") a unique entry may be made in a second data store/data base. Then, as each real vote is cast, the information within the second data store/data base may be used to populate a third data store/data base with information on the actual votes cast. The third data store/data base may provide details on all the votes cast, and by querying this data store/data base at the close of ballot the result can be obtained.

Checks may be included to ensure that each voter only votes for one candidate once (or casts a certain number of votes once in the case of a proportional representation ballot), and that duplicated and forged voting returns are detected and not included in the count. This functionality may be hosted on a governmental postal system, for example, the United States Postal Service ("USPS") Remote Computer Reader ("RCR") and/or the Royal Mail ("RM") Address Interpretation ("AI") system; both provided by Lockheed Martin. Mail scanning and image processing resources exist at each of the USPS' Regional Mail Processing Facilities and provide access to all letter mail processed therein. Likewise, address interpretation resources exist at each of the RM's 71 Mail Centres and provide access to all letter mail processed on RM's automated sorting equipment. The functionality also may be hosted on a private mail processing system such as, for example, a parcel delivery service and/or a corporation with similar and/or equivalent mail processing (i.e., imaging, sorting, etc.) equipment.

In accordance with an embodiment of the present invention, a method for automated postal voting may include, for example:

- Sending voters a ballot paper in the mail, where each ballot paper has a set of unique votes on it (in barcode form)—these are "doubly unique"—per voter and per candidate and each vote has a unique "vote ID".
- The voter may cast their vote, by peeling off the appropriate barcode for their chosen candidate, and affixing it to a return voting card.
- The return voting card may be placed in a windowed return envelope, such that both the return address and the vote barcode are visible through the window and put back in the mail.
- The voter may fill in a separate "Declaration of Identity" card, which includes the voter's registration number, and also places this in the return envelope, if required by a voting authority (e.g., Registrar of the Vote, Election Commission, Local Government Council, etc.).
- A barcode reading function at the mail processing facility(ies) may identify and collect voting data automatically during a predetermined period for voting, via a link to a central "Available Votes" database.
- A "counts" system may run a query on the "Actual Votes Cast" database at the close of poll, to provide the ballot result.

In accordance with an embodiment of the present invention, the method for automated postal voting may optionally include a human-readable indication of the selected candidate. This would be designed so that the human-readable information would not be visible through the windowed return envelope. This would allow a manual count of the votes cast without the need for hand-held barcode readers. This would be useful for:

- Checking the accuracy of the automatic vote reading by comparing it to a manual count—either of the whole poll or of a statistically significant sample.
- Counting postal votes which have failed automatic reading or which for some reason have not been processed through the mail automation.
- This may also prove useful in the case of recounts; either by supporting a full manual recount, or partial count to provide confidence in the automated result.

The detailed concept may include four main processes of: sending the ballot papers to the voters; returning (e.g., mailing/posting) the vote from the voters; returning the declaration of identity from the voters, if required; and counting the votes.

For example, in the United Kingdom ("UK"), local ballots may be typically run on an individual council basis. A few weeks before the vote starts, the individual councils hire printers to generate the voting stationery (including ballot papers and envelopes). Once the first batch of stationery has been sent out in the post (or hand delivered by council officials in some cases), the poll is declared "open". Voters typically have a number of days to make and return their postal vote. Guidance is given regarding expected RM delivery timescales. If voters believe they will miss the posting deadline they can hand in their postal vote at the local council office at any time prior to the poll closing. Along with their vote, voters may return a "Declaration of Identity". The declaration of identity may be placed inside its own envelope, which is itself placed within the vote return envelope. Voters must sign this declaration to promise that they are the person entitled to this vote—in some cases, a counter-signature also may be required. As each voter "casts" his/her vote, e.g., the vote return envelope is received and successfully scanned for the voter's vote, the voter's name is ticked off in the "Marked Register" to indicate that this voter has voted. This constantly updated register may be made available to candidates and their canvassers—who may use it to target members of the public who have not yet voted.

Continuing with the above UK example, at a pre-defined time the poll is declared "closed". Once "closed", any late-arriving ballot papers are not counted. Votes are only ever counted once the poll is closed. Running counts whilst the poll is open are not permissible. Declarations of identity are checked prior to the count and where a declaration of identity is deemed invalid, the associated vote is searched for and removed from the count. This may be accomplished by referring to a voter registration number, which, generally, is printed on both the vote and the declaration. Note that a level of trust is required in the counting staff to ensure that the counting staff knowing the voter's identity does not compromise the general anonymity of the vote.

The following are considered the general, high-level characteristics of an automated postal vote system. For example, the system needs to be able to report on who has voted—but not whom they voted for—to update a "Marked Register". The system also needs to know how people voted, so as to produce a "count". However, it must not be possible for someone to have enough data available to them so they can determine whom voted for whom. Likewise, the "count" may only be calculated at the end of the voting period and a running count during the voting period, generally, is not allowable. In some embodiments, for example, in some United Kingdom elections, postal votes must be accompanied by a Declaration of Identity and votes for which the Declaration of Identity is deemed invalid must not be included within the count.

Based on the above-identified needs, some or all of the following system capabilities may be needed, depending on the specific embodiment of the present invention. The capabilities may include, for example:

- The system maintaining a log of each registered voter who has cast a vote.
- The system maintaining a log for each vote cast of which candidate has been voted for.
- The system being able to count the number of votes cast for each candidate in the vote.
- The system ensuring that the count is not produced until the poll has been deemed closed.
- The system ensuring that counts are not produced until after the poll is closed through procedural methods.
- The system ensuring that no single user has access to enough data to enable the user to determine the candidate voted for by a specific registered voter.
- The system including safeguards to minimize the possibility of collusion between multiple users in order to determine the candidate voted for by a specific registered voter.
- The system including checks to reduce the potential of forged and duplicated votes being included within the ballot count.
- The system restricting user access to authorized users only.
- The system allowing votes already cast to be rejected in the case of an invalid Declaration of Identity being detected associated with that vote.
- The system supporting the running of multiple ballots running simultaneously.

FIG. 1 is an example of a number of postal voting stationery components that may be used in accordance with embodiments of the present invention. In FIG. 1, in a system that provides hardcopies of the voting materials, there may be at least four printed stationery components, which may include a delivery envelope 110 that is addressed to the voter, and assumed to be sent as a Preprinted Postal Indicia (PPI) item from a postal and/or private delivery service; a ballot paper 120 that may contain a list of candidates 121, with a unique bar-coded sticker relating to each candidate 122, 124, 126, 128 for the voter; a voting paper 130 that may contain a pre-printed return address 132 and a pre-defined vote indicium location 134 on which to place one of the unique bar-coded stickers 122, 124, 126, 128; a sometimes optional/sometimes required declaration of identity card/form 140 with a voter signature block 142 and voter registration number 144 to be returned with voting paper 130; and a return envelope 150 in which to return voting paper 130 and declaration of identity card/form 140 and that may be a business reply envelope pre-printed with a specific license number 152 and a postal indicium 154, and having a clear window 156. Postal indicium 154 may include textual and/or encoded machine-readable indications of the mail pieces as being a postal voting mail item and indications of postage paid and other related postage information, for example, class of service, actual amount of postage paid, post by date, etc.

In FIG. 1, delivery envelope 110 may be of sufficient size to hold each of ballot paper 120, voting paper 130, declaration of identity card/form 140, return envelope 150, and, if desired, a separate envelope (not shown) in which to seal declaration of identity card/form 140 before placing it in return envelope 150. In general, declaration of identity card/form 140 is manually checked by election personnel to determine whether it is valid or invalid. This checking usually occurs after voting paper 130 is imaged by a mail processing system, since declaration of identity card/form 140 must be removed from return envelope 150 before being checked. However, in accordance with another embodiment of the present invention, automated electronic signature analysis may be performed on declaration of identity card/form 140. Similarly, return envelope 150 may be of sufficient size to hold each of voting paper 130, declaration of identity card/form 140, and, if desired, the separate envelope in which the declaration of identity may be sealed. Upon receipt and opening of delivery envelope 110, generally, a voter will find ballot paper 120, voting paper 130, and return envelope 150, and possibly may find declaration of identity card/form 140 with or without an associated envelope. To complete the voter's side of the voting process, the voter removes a postal voting indicium associated with their chosen candidate and/or ballot option from ballot paper 120, for example, postal voting indicium 122, and places it in pre-defined vote indicium location 134 on voting paper 130. As seen in FIG. 1, postal voting indicium 122 is associated with Mrs. Jacky Rouge of the Labour party and identified by a vote identification ("ID") 123, which is also reproduced on ballot paper 120 to the left of postal voting indicium 122. By providing vote ID 123 on both postal voting indicium 122 and ballot paper 120, the voter may have some level of assurance that each postal voting indicium is associated with the correct name of each candidate. The voter may place voting paper 130 with postal voting indicium 122 attached thereto in return envelope 150 so that return address 132 and postal voting indicium 122 may be seen through clear window 156, seal return envelope 150, and place return envelope 150 in the mail/post system. If declaration of identity card/form 140 is included and required, prior to sealing return envelope 150, the voter may sign declaration of identity card/form 140 in signature block 142 and place declaration of identity card/form 140 into return envelope 150. Declaration of identity card/form 140 may and/or may not be placed in a separate envelope before being placed in return envelope 150.

Alternatively, in accordance with another embodiment of the present invention, some or all of the voting materials in FIG. 1 may be received/obtained electronically from an electronic postage product (e.g., an online postage program). For example, ballot paper 120 information, voting paper 130, declaration of identity 140 and specific license number 152 and postal indicium 154 may be sent as attachments to an email from the electronic postage product and/or downloaded by the voter from a voting web site. In these alternate embodiments, information on the voter's email address, Internet Protocol ("IP") address, and/or a public/private key certificate may need to be maintained to ensure only the actual voter may receive and use the voting materials. In the electronic embodiments being described here, once the voter has been validated, the voter may select, drag and drop a postal voting indicium, for example, postal voting indicium 122, in pre-defined vote indicium location 134 on voting paper 130, and completed voting paper 130 may be printed. Alternatively, separate completed voting papers for each candidate may be supplied and the desired voting paper may be selected, printed, folded, and put in return envelope 150. If required, declaration of identity 140 also may be printed, signed by the voter and placed in return envelope 150. Return envelope 150 may still need to be sent separately to the voter in delivery envelope 110, since each voter may not have an appropriately sized, clear windowed envelope in which to place voting paper 130.

Alternatively, to eliminate having to separately send the return envelope the voter may print their vote directly on any standard envelope, enclose declaration of identity 140, if required, and send the envelope back for processing. As part of the direct printing on the envelope, specific license number 152, return address 132, postal voting indicium 122 and postal indicium 154 may all be printed directly on the envelope. In yet another alternative, the direct printing may occur on a sheet of paper, for example, 8½"×11", A4, etc., and the sheet may be folded and secured to approximate an "envelope" with the printed side on an exterior surface of the "envelope".

Figure 2:
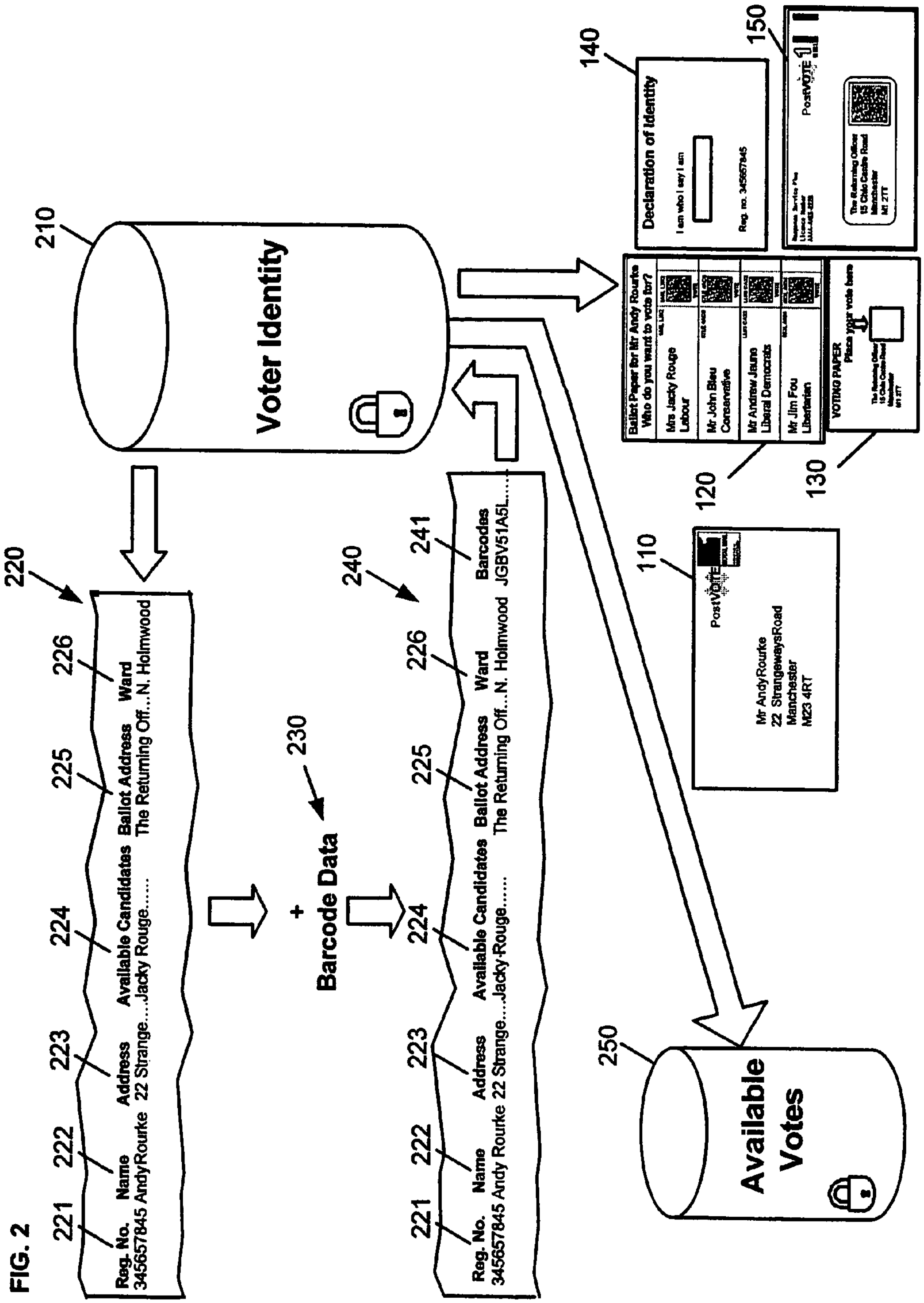
FIG. 2 is an example of a portion of an automated postal voting system to generate a listing of available votes and the associated postal voting stationery components that may be used in accordance with embodiments of the present invention.

FIG. 2 is an example of a portion of an automated postal voting system to generate a listing of available votes and the associated postal voting stationery components that may be used in accordance with embodiments of the present invention. In FIG. 2, a voter identity data base 210 may initially include a voter's registration information 220, which may include, but is not necessarily limited to, a voter registration number 221, a voter name 222, a voter address 223, a listing of available candidates/ballot options 224, a ballot return address 225, and a voting ward/precinct 226. By combining voter registration information 220 with bar code data 230 unique bar codes 241 may be created for each candidate/ballot option on listing of available candidates/ballot options 224, voter identity data base 210 may be updated to contain all of a voter's voting information 240 that is needed for automated postal voting. Once each voter's voting information has been updated to voter identity data base 210, an available votes data base 250 may be generated to include a subset of the voting information stored in voter identity data base 210. For example, available votes data base 250 may include a voter identification ("ID"), which may be an encrypted version of voter registration number 221 and be associated with one vote ID 123 for each candidate/ballot option on listing of available candidates/ballot options 224. A secret encryption process may be used to protect the information and only a very limited number of election officials may be given access to the secret encryption process.

In addition, in FIG. 2, voting materials for each voter including bar codes 241 associated with each possible vote may be created and assembled for sending to each voter. This data may be used by the postal/delivery service and/or a third party printer to print the voting materials. Note that the accuracy of the printing process is critical to the automated postal voting concept and, as such, quality checks to ensure that the voting materials are being printed accurately may also be used. The identity of the voters within the available votes database can only be determined by using the secret encryption process, which transforms the vote ID back to the original voter registration number. This ensures that should access control procedures to the available votes and an actual votes cast databases be breached, it is still not possible to uniquely identify an individual voter without the secret encryption algorithm and key. However, for applications requiring less stringent security, the level of encryption and/or access control procedures may be scaled back accordingly, even to the point of not using either encryption or access control procedures.

Figure 3:
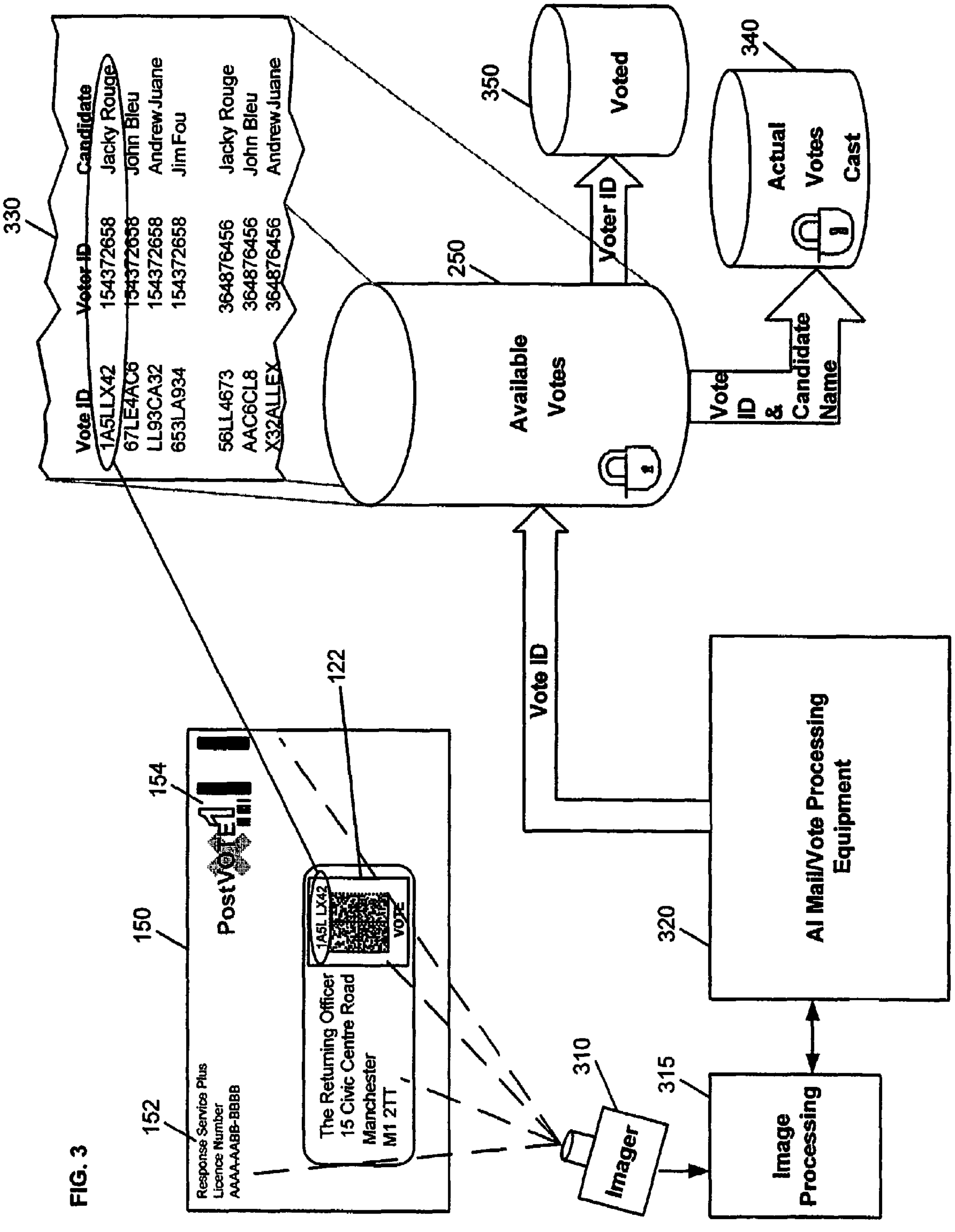
FIG. 3 is a block diagram showing the processing of a return mail piece having affixed thereto a postal voting indicium in the postal voting system, in accordance with an embodiment of the present invention.

FIG. 3 is a block diagram showing the processing of a return mail piece having affixed thereto a postal voting indicium in the automated postal voting system, in accordance with an embodiment of the present invention. In FIG. 3, return envelope 150 may be scanned/imaged by mail processing equipment including, for example, a scanning/imaging device 310 to scan/image information blocks such as postal voting indicium 122, specific license number 152 and postal indicium 154 on return envelope 150. Scanning/imaging device 310 may include but is not limited to a scanner (e.g., bar-code and/or image scanners) and/or a camera. Scanning/imaging device 310 may be connected to an image processing component 315 that may convert and recognize postal indicium 154 and specific license number 152 as designating return envelope 150 as a postal voting item and processing postal voting indicium 122 accordingly. Likewise, image processing component 315 may recognize information in both the bar-coded/datamatrix and text portions of postal voting indicium and forward the recognized information to an AI mail/vote processing equipment 320. Although, in FIG. 3, image processing component 315 is shown separately from AI mail/vote processing equipment 320, the functionality of the two also may be implanted in a single component and/or piece of equipment. As such, in an alternate embodiment, image processing component 315 may merely convert the information blocks on return envelope 150 without performing any recognition functions, and AI mail/vote processing equipment 320 may perform the recognition.

In FIG. 3, AI mail/vote processing equipment 320 may detect the item as an automated postal voting mail piece, and may carry out barcode reading and correlation with available votes database 250. For automated postal voting mail pieces that AI mail/vote processing equipment 320 fails to read after one or more attempts, the mail pieces may be sent to a specific reject stacker (via reject code allocation) for later manual counting. Where a valid correlation is found between the mail piece and available votes database 250, an actual votes cast database 340 may be updated to record the vote ID and associated name of the candidate/ballot option identified by the mail piece and available votes database 250 may be updated to indicate that the votes associated with the voter ID identified in the mail piece are no longer available to be cast. During this process, checks may be made to detect duplicate and forged items. Also, during this process, additional files may be produced to indicate who has voted, and selected information from these files about who has and has not voted may be made available to the public. Of course, the level of information made available may be limited by each election commission/body/authority for privacy and voting system security reasons.

For example, in FIG. 3, once a mail piece vote has been allocated to actual votes cast database 340, AI mail/vote processing equipment 320 may record the unique voter ID associated with that mail piece to ensure that items are not accidentally counted twice due to subsequent sortations of the item by mail processing equipment. The unique voter ID for each voter who has actually voted may be used to update a voted database 350, which also may be referred to as a marked register. The update to voted database 350 may occur as each vote is "counted" and/or at a pre-defined frequency. For voters who lose their postal vote cards, the voted database 350 may be checked (to ensure they have not voted) and the voter may be allowed to either vote manually (non-postal) or be re-issued the original voting materials (postal). Duplicate-checks may be used in the mail piece to ensure that a voter does not vote twice in this case.

In accordance with embodiments of the present invention, security may be addressed both at the physical mail piece level and at the database level. For example, as described above in relation to FIGS. 2 and 3, three separate and secure databases may be used. Specifically, voter identity database 210 to define who is allowed to vote and that, generally, is assumed to be controlled by the election commission/body; available votes database 250, which may be produced by a vendor and/or the election commission/body using the automated postal voting system and data provided by the election commission/body; and actual votes database 340, which may be produced by the automated postal voting system and populated by transactions on available votes database 250. In general, access rights may be set and/or controlled such that only a select few have access to more than one database. Alternatively, in accordance with another embodiment of the present invention, the functionality of the above separate databases may be implemented in a single database using secure tables that have similarly restricted access rights so that only a select few have access to more than one of the tables.

In accordance with embodiments of the present invention, in order to provide voter anonymity, the "voter ID" that is used to identify the voter within the databases may be an encryption of the voter registration number, which may be used to identify the voter within voter identity database 210. Through this database structure, the use of encryption, and the use of doubly-unique barcodes, the "vote" represented in postal voting indicium 122 is completely meaningless to all but those with access to available votes database 250. Even then, although anyone having this access may be able to determine who was voted for, they would also need access to voter identity database 210 AND the voter ID encryption process in order to determine who actually cast each vote.

In addition, in accordance with embodiments of the present invention, the uniqueness of each barcode may combat duplication and the correlation of the barcodes against available votes database 250 may combat forgery. Personal data in these databases is safe since no personal information is contained within postal voting indicium 122 including, for example, the voter's registration number.

In accordance with embodiments of the present invention, in general, a unique barcode (e.g., a unique vote ID) is required for every combination of candidate and voter. For example, by using an 8 character ID and an OCR-friendly reduced character set of 0123456789AUCLEX, 4,300 million unique barcodes can be supported. Assuming a voting population of 100 million, this would allow an average of 43 candidates per voting paper. Increasing the character set by 1 character may increase the number of possible unique barcodes to 6,900 million, which would allow an average of 69 candidates per voting paper for the 100 million voting population. In addition, if deemed necessary, a ballot ID may be added to the 2-D barcode data to guarantee that vote IDs are never allocated to the wrong ballot.

Alternatively, in FIG. 3, the database design shown and described may be changed such that available votes database 250 does not include the associated name of the candidate/ballot option that each vote relates to, but only actual votes cast database 340 contains this information. The exact design/structure of each of the databases may be varied to meet the requirements of a sponsoring electoral/election commission/body.

As an option, AI mail/vote processing equipment 320 may be upgraded to support bespoke tracking and culling of automated postal voting mail pieces. For example, the postal indicia design on the delivery envelope may be upgraded to contain a 1-dimensional locator barcode that would allow the items to be detected and tracked within the mainstream. If desired, AI mail/vote processing equipment 320 may generate tracking reports of automated postal voting mail pieces. In addition, should the postal indicia design include an OCR-friendly license identifier, the tracking could be enhanced to provide reports on a per-license basis.

In the case of the return envelope, AI mail/vote processing equipment 320 also may detect the items and provide bespoke sorting and reporting on these items. Again, tracking reports also may be provided to on a per-license basis.

Figure 4:
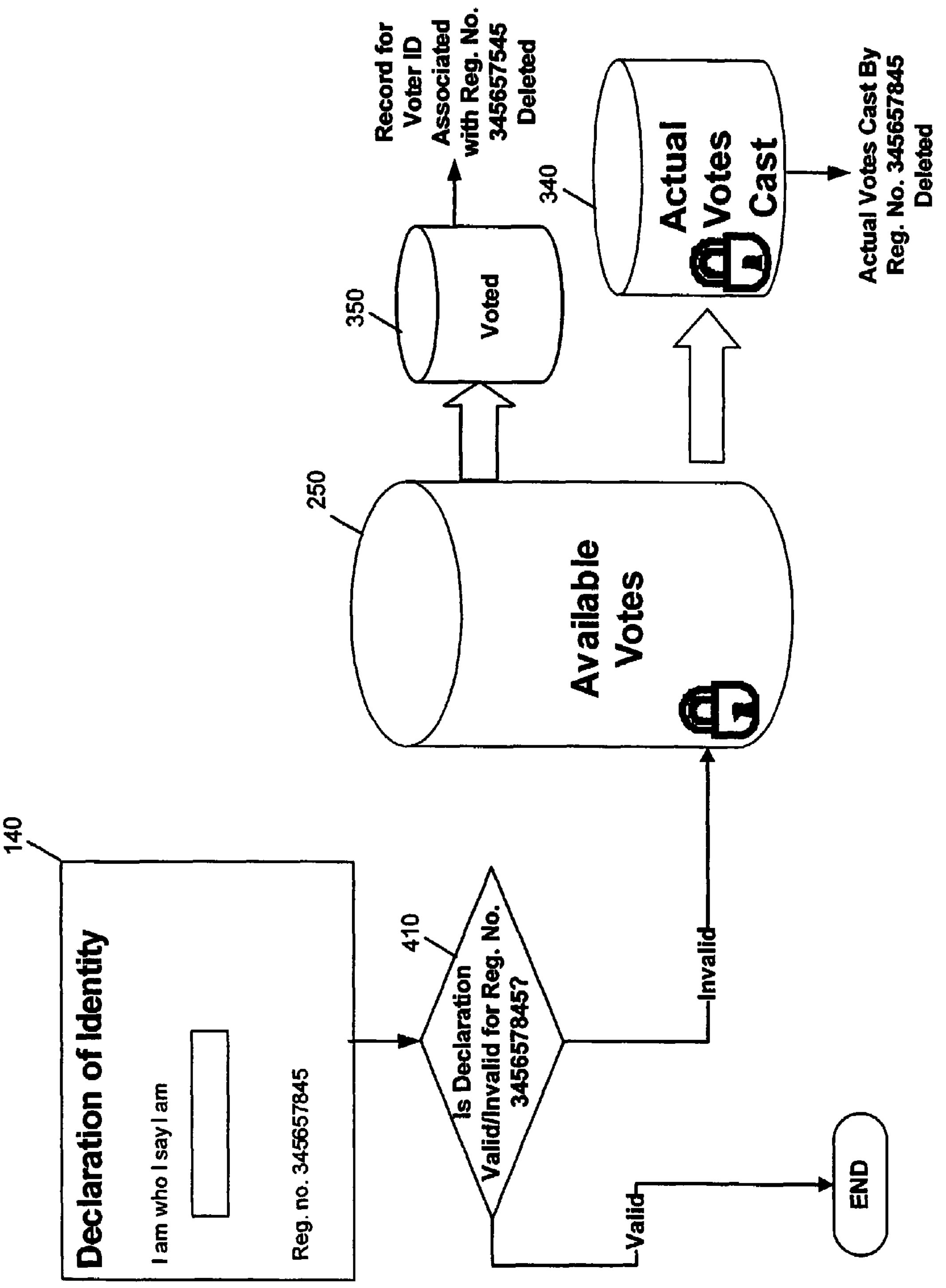
FIG. 4 is a block diagram showing the processing of a declaration of identity form for a voter in an automated postal voting system, in accordance with an embodiment of the present invention.

FIG. 4 is a block diagram showing the processing of a declaration of identity form for a voter in the automated postal voting system, in accordance with an embodiment of the present invention. In FIG. 4, declaration of identity card/form 140 for voter registration number 345657845 may be manually examined by election personnel and/or electronically examined to determine (410) whether it is valid. If it is valid, no additional processing of information related to the vote associated with voter registration number 345657845 need be performed before the counting of the votes occurs and processing of this information may end. However, if it is invalid, the information related to the vote associated with voter registration number 345657845 may be removed from/amended in the databases by first encrypting the voter registration number to obtain the voter ID. For example, if declaration of identity card/form 140 for voter registration number 345657845 is determined (410) to be invalid, available votes database 250 may be updated to show that the votes associated with the voter ID obtained from the above encryption are again available to be cast. In addition, actual votes cast database 340 may be updated to delete the vote previously recorded for this voter ID and the information in voted database 350 may be updated to show that the person with voter registration number 345657845 has not voted. This process allows votes to be rejected when declaration of identity card/form 140 is determined to be invalid. Again, encryption allows the vote to be rejected without voter anonymity being compromised.

Figure 5:
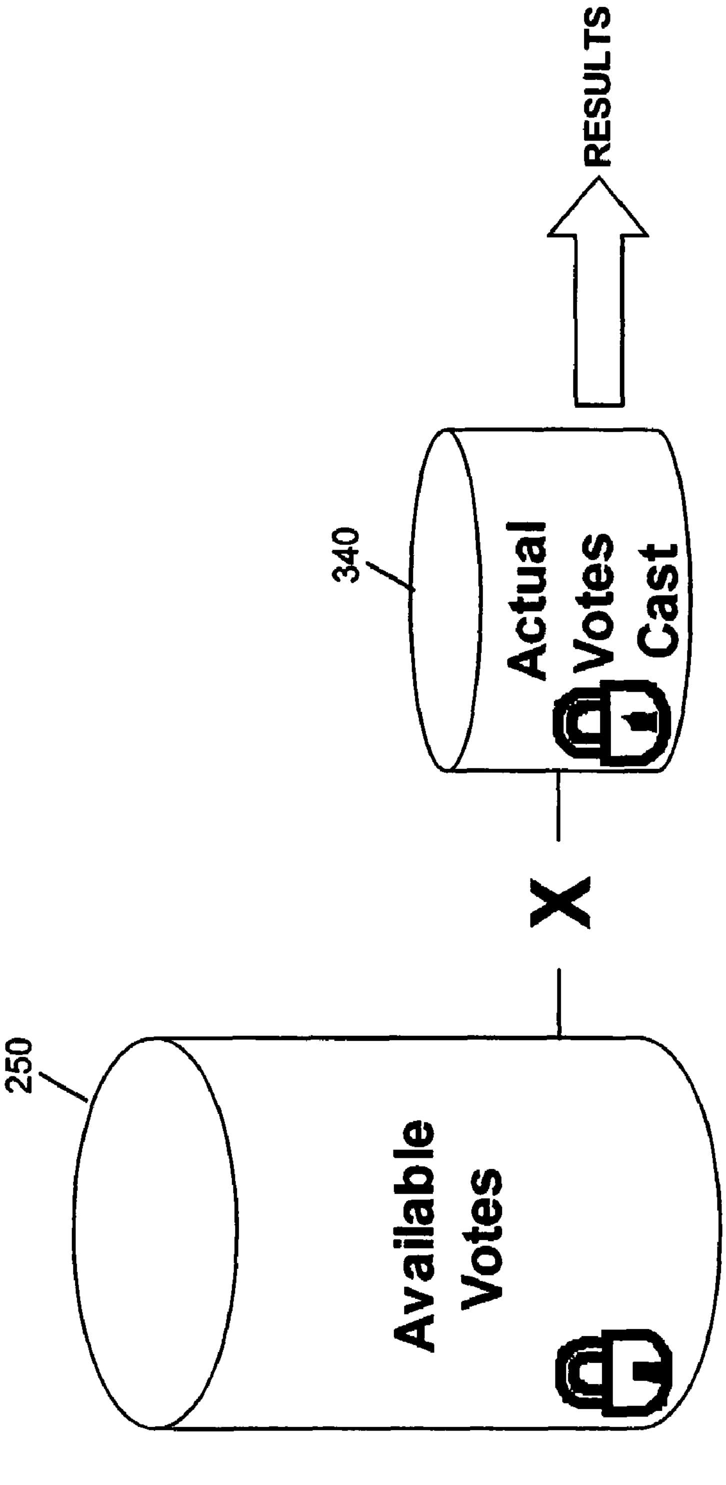
FIG. 5 is an example of another portion of an automated postal voting system configured to generate a final count of actual votes received, in accordance with embodiments of the present invention.

FIG. 5 is an example of another portion of an automated postal voting system configured to generate a final count of actual votes received, in accordance with embodiments of the present invention. In FIG. 5, available votes database 250 and actual votes cast database 340 are shown immediately after the allotted period for voting has ended to no longer be in communication, i.e., linked, with each other. As a result, no additional votes may be recorded in actual votes cast database 340, and the votes currently recorded may be counted and the results output to election officials. For example, the count result may either be retained on AI mail/vote processing equipment 320, or provided via a secure electronic link to an election official.

Figure 6:
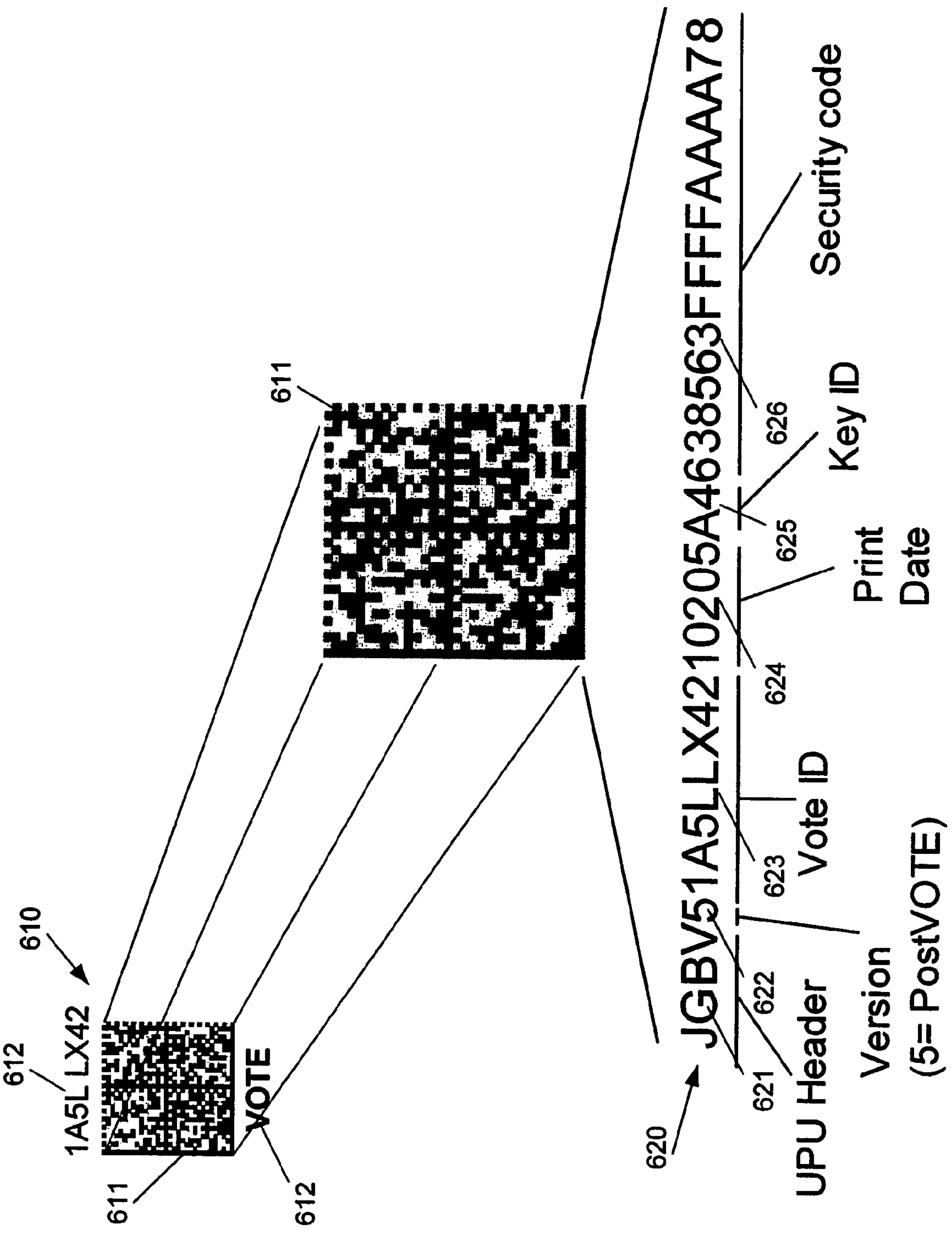
FIG. 6 is a block diagram including a partially exploded view of a postal voting indicium, in accordance with an embodiment of the present invention.

FIG. 6 is a block diagram of a postal voting indicium including a partially exploded view of the postal voting indicium, in accordance with an embodiment of the present invention. In FIG. 6, a postal voting indicium 610 may include a bar-coded portion 611 (e.g., a datamatrix) in which the vote ID may be encoded, a human-readable portion 612 that may provide a human-readable version of the vote ID encoded in bar-coded portion 611, and a message portion 613 that may be used to advertise the voting and/or provide messages to encourage voters to vote. Human-readable portion 612 may be used to manually count the vote, if bar-coded portion 611 is unreadable, and also may contain characters that may be imaged and converted using an OCR conversion program to permit automated processing. In general, message portion 613 only will be used for generic election advertising and/or encouragement messages and not for the specific candidates and/or issues being voted on. For example, bar-coded portion 611 may be implemented as a 22 by 22 element code representing up to 43 alphanumeric characters as well as a 32 by 32 element code representing up to 91 alphanumeric characters. In the embodiment shown in FIG. 6, a 36-character code 620 may be encoded in/represented by bar-coded portion 611. Code 620 may include, for example, a 4-character universal postal union ("UPU") header 621, a 1-character version code 622, an 8-character vote ID 623, a 5-character print date 624, a 2-character key ID 625, and a 16-character security code 626. The contents/meaning of UPU header 621 may be defined by an applicable standard. Version code 622 may represent a version/type of the datamatrix, for example, in FIG. 6; version code 622 is equal to 5, which may be interpreted by AI mail/vote processing equipment 320 to be a postal voting indicium, which would cause AI mail/vote processing equipment 320 to handle the mail piece accordingly. Vote ID 623 may represent a unique vote for a specific candidate/ballot option by a specific voter. Print date 624 may represent the date on which the datamatrix was printed, for example, 5-character print date 624 may be in the format dddyy, where ddd=Julian day and yy=year, which means that the value shown in FIG. 6 represents the 102nd day of 2005. Of course any other character length date formats may also be used. Key ID 625 may represent a triple data encryption standard ("DES3") key(s) or the like key(s) that is/are to be used to generate a hashing code for the datamatrix and security code 626 may represent a type of digital signature to combat forgery.

Figure 7:
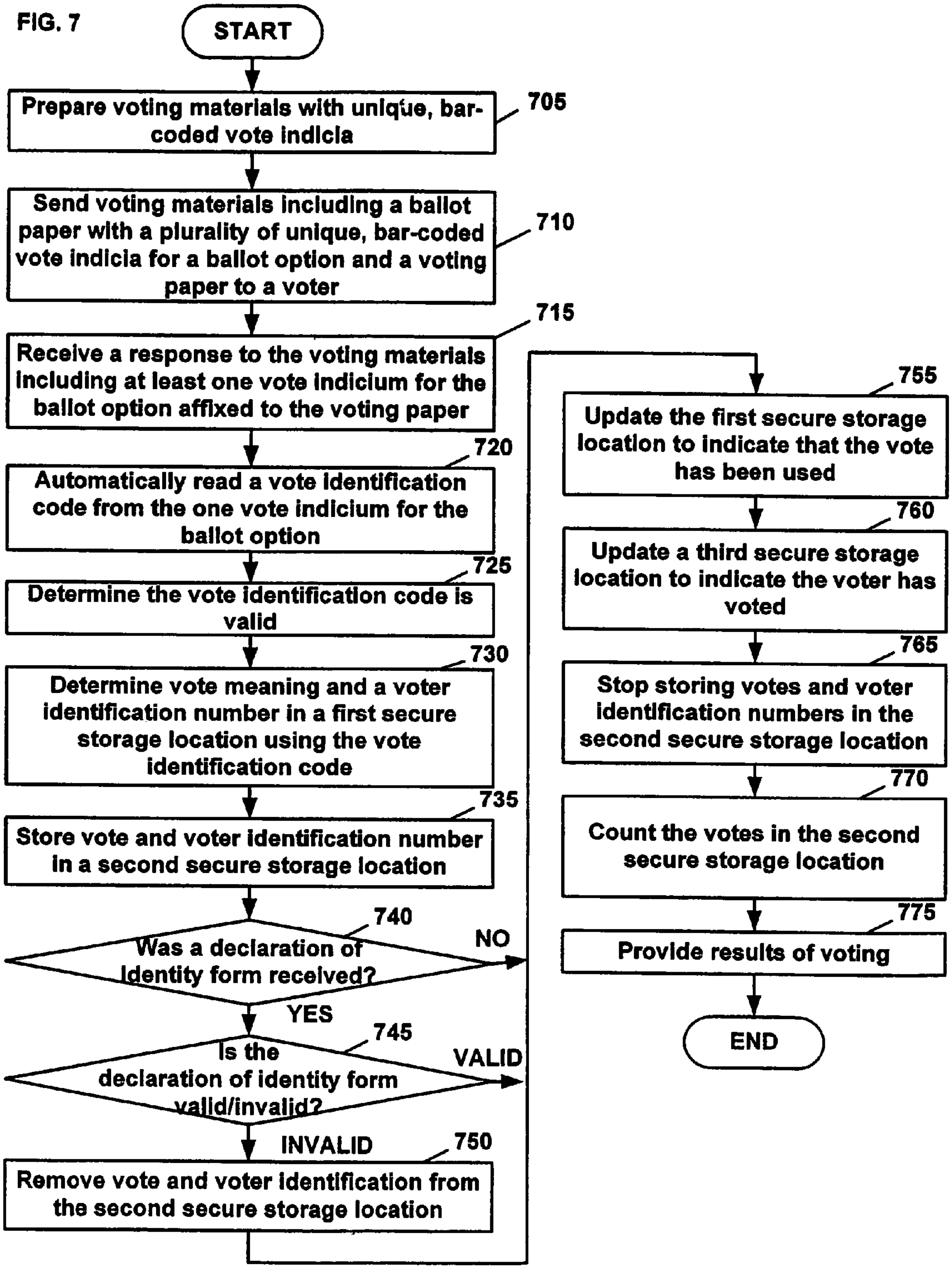
FIG. 7 is a flow diagram of a method for preparing and using a postal voting indicium, in accordance with an embodiment of the present invention.

FIG. 7 is a flow diagram of a method for preparing and using a postal voting indicium, in accordance with an embodiment of the present invention. In FIG. 7, the method may include preparing (705) voting materials (e.g., a delivery envelope, a ballot paper with a plurality of unique bar-coded vote indicium (i.e., stamps, stickers, labels etc.) for each ballot option, a voting paper, and a return envelope). The voting materials may optionally include a declaration of identity form to be filled out by the voter to attest to the fact that they are the person associated with the voter registration number on the declaration of identity form. The method also may include sending (710) the voting materials including the ballot paper with the plurality of unique bar-coded vote indicia for each ballot option to a voter and subsequently receiving (715) a response to the voting materials with one of the plurality of unique bar-coded vote indicia for the ballot option affixed to the voting paper. The method may further include automatically reading (720) the one vote indicia for the ballot option affixed to the voting paper to collect voting information including a vote identification code contained in the vote stamp. The method may include determining (725) the vote identification code for the one vote indicia is valid and determining (730) a voter identification/registration number for the voter associated with the one vote stamp and a vote meaning (i.e., value associated with the one vote indicia from a first secure storage location using the vote identification code of the one vote indicium. The method may still further include storing (735) the vote identification code and the vote value in a new record in a second secure storage location.

In FIG. 7, the method may further include determining (740) whether a declaration of identity form was included with the voting paper in the return envelope. In general, the declaration of identity form is not required, but its use may help prevent vote fraud. If it is determined (740) that a declaration of identity form was returned, whether the declaration of identity form is valid or invalid may be determined (745) and, if invalid, the vote identification code and the vote value stored (735) in the new record in the second secure storage location may be removed (750). If it is determined (740) that no declaration of identity form was returned or it is determined (745) that the declaration of identity form is valid (i.e., contains a valid signature for the voter identified by the voter registration number on the declaration of identity card/form), the method may include updating (755) the first secure storage location to indicate that the vote value associated with the one vote indicia for the voter identified by the voter identification/registration number has been used. The method may further include updating (760) a third storage location to indicate that the voter associated with the voter identification code has voted. The third storage location may be implemented as a non-secure and/or secure storage location and may be used to provide information on which voters have and/or have not voted to interested groups and/or individuals so they may target/limit their "get out the vote" efforts to only those people who have not voted.

In FIG. 7, the method may further include stopping (765) the storage of new vote records in the second secure storage location. This signifies the end of the voting period and may be accomplished by de-linking the first secure storage location and the second secure storage location. In general, the stopping (765) may be implemented to permit any votes that were received prior to the end of the voting period to be stored (735) in the second secure database. The method may still further include counting (770) a number of vote values for each different choice for the ballot option in the records stored in the second secure storage location, and providing (775) results of the voting, for example, outputting a total number of vote values for each of the different choices for the ballot option and the method may end. The results may be provided with and/or without an explicit indication of the ballot option that received the most votes as well as a variety of statistical information (e.g., percent of total votes, percent of eligible votes, etc.). The method of FIG. 7 may be embodied in a machine-readable format (e.g., an executable computer software application/program) and stored on a machine-readable medium (e.g., a hard disk, Random Access Memory ("RAM"), etc.) for execution by a machine (e.g., computer, processing systems, etc.) in communication with the machine-readable medium.

Figure 8:
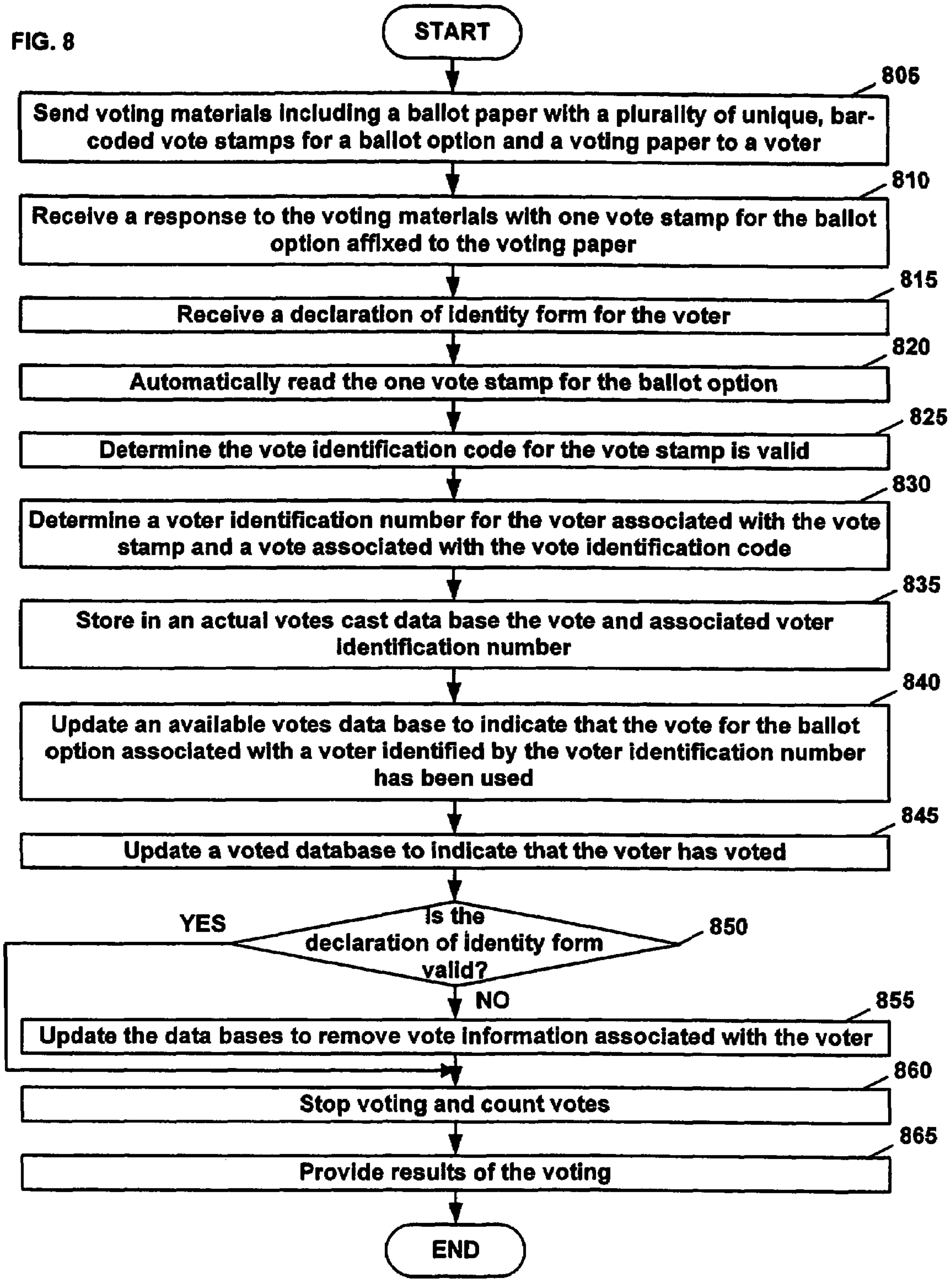
FIG. 8 is a flow diagram of a method for preparing and using a postal voting indicium, in accordance with another embodiment of the present invention.

FIG. 8 is a flow diagram of a method for preparing and using a postal voting indicium, in accordance with another embodiment of the present invention. In FIG. 8, the method may include sending (805) voting materials (e.g., a delivery envelope, a ballot paper with a plurality of unique bar-coded vote indicium (i.e., stamps, stickers, labels, etc.) for each ballot option, a voting paper, a declaration of identity form, and a return envelope) a voter and subsequently receiving (810) a response to the voting materials with one of the plurality of unique bar-coded vote indicium for the ballot option affixed to the voting paper, and receiving (815) a declaration of identity form for the voter. The method may further include automatically reading (820) the one vote indicia for the ballot option affixed to the voting paper to collect voting information including a vote identification code contained in the vote indicia. The method may include determining (825) the vote identification code for the one vote indicia is valid and determining (830) a voter identification/registration number for the voter associated with the one vote indicium and a vote meaning (i.e., value) associated with the one vote indicia from an available votes data storage location (e.g., a secure available votes database) using the vote identification code of the one vote indicia. The method may still further include storing (835) the vote value, for example, the vote identification code and the voter value, for example, the voter identification/registration number, in a new record in an actual votes cast storage location (e.g., a secure actual votes cast database). The method may still further include updating (840) the available votes storage location to indicate that the votes for the ballot option associated with the voter identified by the voter identification number are no longer available to be used.

In FIG. 8, the method may further include updating (845) a voted storage location (e.g., a voted database) to indicate that the voter identified by the voter identification number has voted, but not how the voter has voted. The voted storage location may be implemented as a non-secure and/or secure storage location and may be used to provide information on which voters have and/or have not voted to interested groups and/or individuals so they may target/limit their "get out the vote" efforts to only those people who have not voted.

In FIG. 8, the method may further include determining (850) whether the declaration of identity form for the voter is valid or invalid (i.e., contains a valid signature for the voter identified by the voter registration number on the declaration of identity form). If the declaration of identity form for the voter is determined (850) to be invalid, the available votes storage location, actual votes cast storage location and the voted storage location may be updated (855) to remove the information associated with the vote from the voter. Following the updating (855) of the storage locations or, if the declaration of identity form was determined (850) to be valid, the method may include ending the voting by stopping (860) the storage of new vote records in the actual votes cast storage location. This may be accomplished by de-linking the available votes storage location and the actual votes cast storage location. In general, the stopping (860) may be implemented to permit any votes that were received prior to the end of the voting period to be stored (835) in the actual votes cast database and the updating (840, 845) of information in the available votes storage location and the voted storage location. The method may still further include counting (865) a number of vote values for each different choice for the ballot option in the records stored in the actual votes cast storage location, and providing (870) results of the voting, for example, outputting a total number of vote values for each of the different choices for the ballot option and the method may end. The results may be provided with and/or without an explicit indication of the ballot option that received the most votes as well as a variety of statistical information (e.g., percent of total votes, percent of eligible votes, etc.). As in FIG. 7, the method of FIG. 8 may be similarly embodied in a machine-readable format, stored on a machine-readable medium, and executable by a machine in communication with the machine-readable medium.

Figure 9:
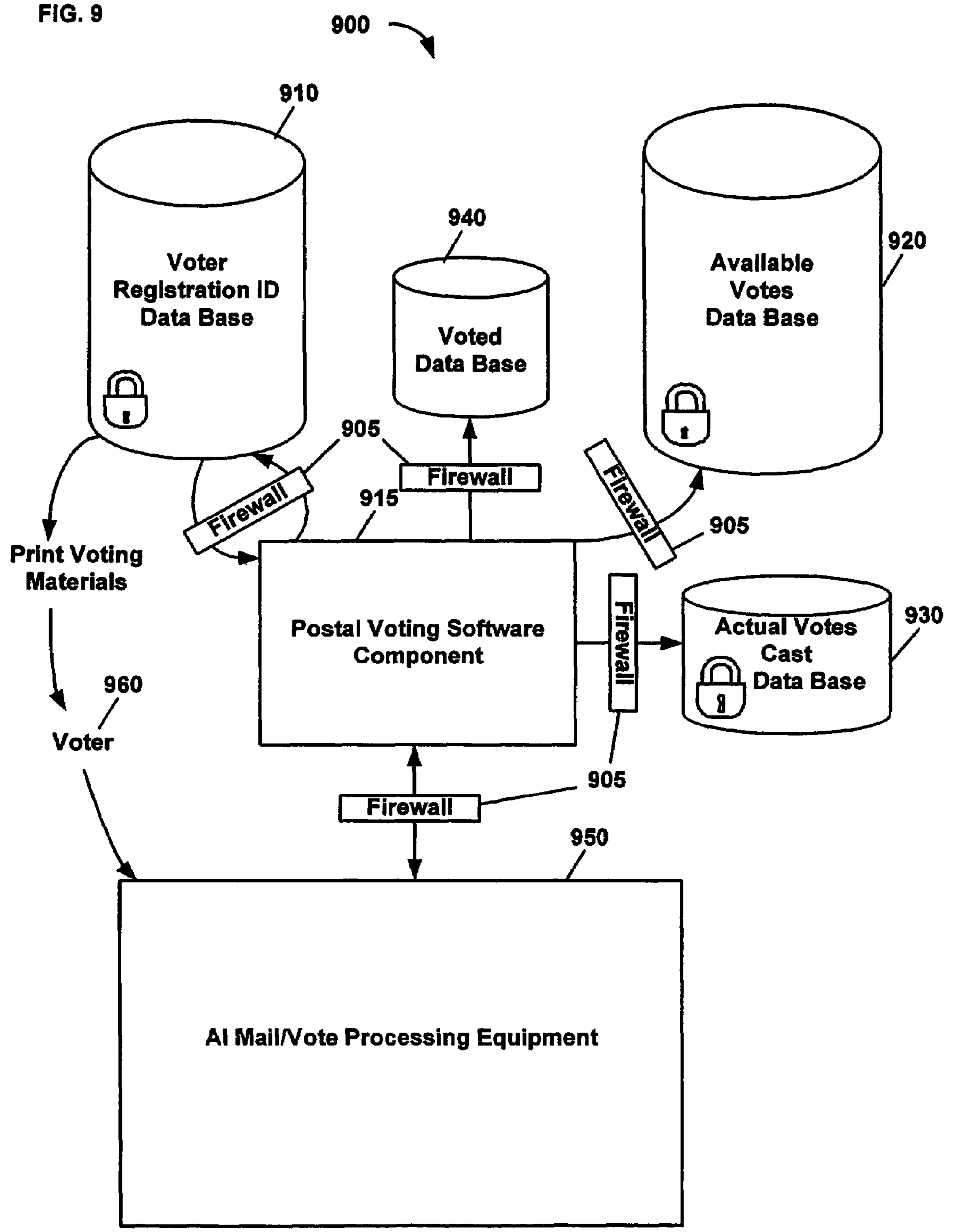
FIG. 9 is a block diagram of a system to generate, print and use a postal voting indicium, in accordance with another embodiment of the present invention.

FIG. 9 is a block diagram of a system to generate, print and use a postal voting indicium, in accordance with another embodiment of the present invention. In FIG. 9, a system 900 for implementing automated postal voting may include a voter registration identification database 910 in which all of the voter registration information for a specific location (e.g., precinct, district, municipality, group, organization, etc.) may be maintained by an election board/commission/etc. Prior to an election, voter registration identification database 910 may be updated with barcode data for each possible vote option for each voter in voter registration identification database 910. The updating may be performed by the election board/commission/etc. or a third-party using an automated postal voting component 915, for example, a software program, which may also be in communication with an available votes database 920, an actual votes cast database 930, a voted database 940, and an AI mail/vote processing component 950. All or part of automated postal voting component 915 also may be implemented within AI mail/vote processing equipment 950. In addition, system 900 may be implemented in a network environment, for example, a local area network ("LAN"), a wide area network ("WAN"), the Internet, etc., with a firewall 905 between each component to ensure each component remains secure.

Although only one firewall 905 is shown between each component and automated postal voting software component 915, additional firewalls and/or other security systems/techniques known to those of one skill in the art may be used between each. For example, if voter registration ID database 910 and automated postal voting software component 915 communicate over the Internet, a firewall may be needed between each component and the Internet.

In FIG. 9, the interaction between system 900 and a voter 960 through the various methods and devices described herein is illustrated. For example, voter 960 may receive the voting materials printed using information in voter registration ID database 910 and send a return envelope with a vote paper in reply, which may be received and processed by AI mail/vote processing equipment 950 and automated postal voting software component 915 in accordance with one or more of the methods described above.

In accordance with an embodiment of the present invention, a method may include preparing voting materials with a plurality of unique, bar-coded vote indicia that are each associated with a different choice for a ballot option and a voter. The method may further include receiving a mailed response with one vote indicium of the plurality of unique, bar-coded vote indicia and automatically reading the one vote indicium for the ballot option and determining a vote identification code for the one vote indicium is valid. The method may still further include securely determining a voter identification number for the voter from the one vote indicium and a vote value associated with the one vote indicium, securely storing the vote identification code and the vote value, and securely indicating that the vote value associated with the one vote indicium for the voter identified by the voter identification number has been used. The method may still further include securely indicating that the voter has voted, stopping the secure storing of new records, securely counting a number of vote values for each different choice for the ballot option, and providing a total number of vote values for each different choice for the ballot option.

In accordance with an embodiment of the present invention, a method may include: preparing voting materials with a plurality of unique, bar-coded vote indicia and mailing the voting materials including a ballot paper with the plurality of unique, bar-coded vote indicia for a ballot option to a voter, each vote indicium in the plurality of unique, bar-coded vote indicia being associated with a different choice for the ballot option by the voter. The method further may include receiving a mailed response to the ballot paper with one vote indicium of the plurality of unique, bar-coded vote indicia for the ballot option affixed to the response and automatically reading the one vote indicium for the ballot option affixed to the response to collect voting information including a vote identification code contained in the vote indicium. The method may still further include determining the vote identification code for the one vote indicium is valid and determining a voter identification number for the voter associated with the one vote indicium and a vote value associated with the one vote indicium from a first secure storage location using the vote identification code of the one vote indicium. The method may still further include storing the vote identification code and the vote value in a new record in a second secure storage location, updating the first secure storage location to indicate that the vote value associated with the one vote indicium for the voter identified by the voter identification number has been used, and updating a third secure storage location to indicate that the voter has voted. The method may still further include stopping the storing of new records in the second secure storage location, counting a number of vote values for each different choice for the ballot option in the records stored in the second secure storage location, and providing a total number of vote values for each different choice for the ballot option.

In accordance with an embodiment of the present invention, a machine-readable medium may have stored thereon executable instructions for performing a method of processing voting materials including a ballot with a plurality of unique, bar-coded vote indicia for a voter, each vote indicium in the plurality of unique, bar-coded vote indicia being associated with a different choice for the ballot option by the voter, the method may include: automatically reading one vote indicium for the ballot option attached to a response to collect voting information including a vote identification code contained in the vote indicium. The method may further include determining the vote identification code for the one vote indicium is valid, determining a voter identification number for the voter associated with the one vote indicium and a vote value associated with the one vote indicium from a first secure storage location using the vote identification code of the one vote indicium, and sending the vote identification code and the vote value for storage in a new record in a second secure storage location. The method may still further include updating the first secure storage location to indicate that the vote value associated with the one vote indicium for the voter identified by the voter identification number has been used, updating a third secure storage location to indicate that the voter has voted, and ending the storing of new records in the second secure storage location. The method may still further include counting a number of vote values for each different choice for the ballot option in the records stored in the second secure storage location, and providing a total number of vote values for each different choice for the ballot option.

In accordance with an embodiment of the present invention, a voting indicium product may include: a human-readable portion of a voting indicium product to represent a unique vote identification element for a specific ballot choice by a specific voter; and a bar-coded portion of the voting indicium product to represent the unique vote identification element for the specific ballot choice by the specific voter, the bar-coded portion encoding at least the unique vote identification element.

What is claimed is:

1. A method comprising:

- preparing voting materials with a plurality of unique, bar-coded vote indicia;
- mailing the voting materials including a ballot paper with the plurality of unique, bar-coded vote indicia for a ballot option to a voter, each vote indicium in the plurality of unique, bar-coded vote indicia being associated with a different choice for the ballot option by the voter;
- receiving a mailed response to the ballot paper with one vote indicium of the plurality of unique, bar-coded vote indicia for the ballot option affixed to the response;
- automatically reading the one vote indicium for the ballot option affixed to the response to collect voting information including a vote identification code contained in the vote indicium;
- determining the vote identification code for the one vote indicium is valid;
- determining a voter identification number for the voter associated with the one vote indicium and a vote value associated with the one vote indicium from a first secure storage location using the vote identification code of the one vote indicium;
- storing the vote identification code and the vote value in a new record in a second secure storage location;
- updating the first secure storage location to indicate that the vote value associated with the one vote indicium for the voter identified by the voter identification number has been used;
- updating a third secure storage location to indicate that the voter has voted;
- stopping the storing of new records in the second secure storage location;
- counting a number of vote values for each different choice for the ballot option in the records stored in the second secure storage location; and
- providing a total number of vote values for each different choice for the ballot option.

2. The method of claim 1 wherein the preparing voting materials comprises:

- determining a plurality of unique, bar-coded vote stamps for the ballot option for the voter;
- storing the plurality of unique, bar-coded vote stamps for the ballot option for the voter in a record for the voter in a voter registration data base;
- printing a delivery envelope;
- printing the plurality of unique, bar-coded vote stamps for the ballot option
- printing the ballot paper with a predefined space for at least one unique, bar-coded vote stamp; and
- printing the return envelope.

3. The method of claim 2 wherein the preparing voting materials further comprises:

- preparing an identity declaration.

4. The method of claim 1 wherein the receiving a mailed response further comprises:

- receiving a declaration of identity from the voter through the mail system.

5. The method of claim 4 further comprising:

- determining whether the declaration of identity is valid or invalid;
- removing the new record representing the vote identification code, vote and voter identification number from the second data base, if the declaration of identity is invalid.

6. The method of claim 1 wherein the mailing and receiving are done through a mail system.

7. The method of claim 1 wherein the mailing is done electronically.

8. The method of claim 1 wherein the mailing is done electronically over a network.

9. The method of claim 8 wherein the mailing done over the network includes sending the mailing from an electronic postage product.

10. The method of claim 1 wherein the ending of the storing of new records in the second secure storage location is accomplished by preventing communication between the first and second secure storage locations.

11. A machine-readable medium having stored thereon executable instructions for performing a method of processing voting materials including a ballot with a plurality of unique, bar-coded vote indicia for a voter, each vote indicium in the plurality of unique, bar-coded vote indicia being associated with a different choice for the ballot option by the voter, the method comprising:

- automatically reading one vote indicium for the ballot option attached to a response to collect voting information including a vote identification code contained in the vote indicium;
- determining the vote identification code for the one vote indicium is valid;
- determining a voter identification number for the voter associated with the one vote indicium and a vote value associated with the one vote indicium from a first secure storage location using the vote identification code of the one vote indicium;

sending the vote identification code and the vote value for storage in a new record in a second secure storage location;

updating the first secure storage location to indicate that the vote value associated with the one vote indicium for the voter identified by the voter identification number has been used;

updating a third secure storage location to indicate that the voter has voted;

ending the storing of new records in the second secure storage location;

counting a number of vote values for each different choice for the ballot option in the records stored in the second secure storage location; and providing a total number of vote values for each different choice for the ballot option.

12. The machine-readable medium of claim 11 further comprising:

sending the voting materials to the voter electronically.

13. The machine-readable medium of claim 12 wherein the sending is done over a network.

14. The machine-readable medium of claim 11 wherein the method further comprises:

determining a plurality of unique, bar-coded vote stamps for the ballot option for the voter; and storing the plurality of unique, bar-coded vote stamps for the ballot option for the voter in a record for the voter in a voter registration data base.

15. The machine-readable medium of claim 14 wherein the method further comprises:

printing a delivery envelope;

printing the plurality of unique, bar-coded vote stamps for the ballot option printing the ballot paper with a predefined space for at least one unique, bar-coded vote stamp; and printing the return envelope.

16. The machine-readable medium of claim 11 wherein the ending of the storing of new records in the second secure storage location is accomplished by preventing communication between the first and second secure storage locations.

* * * * *

UNITED STATES PATENT AND TRADEMARK OFFICE

CERTIFICATE OF CORRECTION

PATENT NO. : 7,427,025 B2
APPLICATION NO. : 11/176256
DATED : September 23, 2008
INVENTOR(S) : Jeffrey S. Poulin and Graeme S. Urquhart It is certified that error appears in the above-identified patent and that said Letters Patent is hereby corrected as shown below:

Column 18, please correct lines 13-16 as follows:

printing the plurality of unique, bar-coded vote stamps for the ballot option
printing the ballot paper with a pre-defined space for at least one unique, bar-coded vote stamp; and Signed and Sealed this Sixteenth Day of December, 2008

JON W. DUDAS
*Director of the United States Patent and Trademark Office*